US007876318B2

(12) United States Patent
Ishiyama

(10) Patent No.: US 7,876,318 B2
(45) Date of Patent: Jan. 25, 2011

(54) THREE-DIMENSIONAL DATA PROCESSING SYSTEM

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/155,286

(22) Filed: Jun. 2, 2008

(65) Prior Publication Data

US 2008/0303814 A1    Dec. 11, 2008

Related U.S. Application Data

(63) Continuation of application No. PCT/JP2007/055385, filed on Mar. 16, 2007.

(30) Foreign Application Priority Data

Mar. 17, 2006  (JP) .............................. 2006-074054

(51) Int. Cl.
*G06T 15/00* (2006.01)
(52) U.S. Cl. ...................................... 345/419
(58) Field of Classification Search ................. None
See application file for complete search history.

(56) References Cited

U.S. PATENT DOCUMENTS

| 4,903,317 | A |  | 2/1990 | Nishihara et al. |
| 5,960,118 | A | * | 9/1999 | Briskin et al. ................ 382/243 |
| 6,021,224 | A |  | 2/2000 | Castelli et al. |
| 6,141,445 | A |  | 10/2000 | Castelli et al. |
| 6,559,842 | B1 | * | 5/2003 | Deering et al. .............. 345/420 |
| 6,873,324 | B2 |  | 3/2005 | Saito et al. |
| 7,006,656 | B2 | * | 2/2006 | Fridrich et al. .............. 382/100 |
| 7,071,935 | B1 | * | 7/2006 | Deering et al. .............. 345/419 |
| 7,076,735 | B2 | * | 7/2006 | Callegari .................... 715/733 |
| 7,190,284 | B1 | * | 3/2007 | Dye et al. ..................... 341/51 |
| 7,221,801 | B2 | * | 5/2007 | Jang et al. ................... 382/232 |
| 7,321,370 | B2 |  | 1/2008 | Ishiyama |
| 7,425,950 | B2 | * | 9/2008 | Ito et al. ..................... 345/419 |

(Continued)

FOREIGN PATENT DOCUMENTS

JP    63-045684    2/1988

(Continued)

OTHER PUBLICATIONS

W. Schroeder et al., "Decimation of Triangle Meshes," Computer Graphics, vol. 26, Jul. 1992, pp. 65-70.

*Primary Examiner*—Said Broome
(74) *Attorney, Agent, or Firm*—Foley & Lardner LLP

(57) ABSTRACT

A three-dimensional data processing system performs a collating operation precisely and can reduce the quantity of data necessary for presenting candidate data. A storage device stores the three dimensional data of each reference body in a set of the primary compressed data, which has been prepared by compressing three-dimensional data in an irreversible compression method, and the secondary compressed data for compensating difference between the three-dimensional data restored from the primary compressed data and the original three-dimensional data. A server device collates, when it receives the collation object data, the three-dimensional data decompressed from the primary compressed data and the secondary compressed data of each reference object with the collation object data, and transmits the primary compressed data of the several reference objects of higher similarities to the client device. This client device decompresses and displays the primary compressed data on a display device.

12 Claims, 12 Drawing Sheets

U.S. PATENT DOCUMENTS

2002/0097906 A1* 7/2002 Ishiyama .................... 382/154
2006/0291731 A1* 12/2006 Schoisswohl ............... 382/238

FOREIGN PATENT DOCUMENTS

| | | |
|---|---|---|
| JP | 10-285407 | 10/1998 |
| JP | 10-290460 | 10/1998 |
| JP | 2002-008060 A | 1/2002 |
| JP | 2002-157595 A | 5/2002 |
| JP | 2005-087069 A | 4/2005 |

* cited by examiner

FIG. 3

| DATA NAME | METADATA | PRIMARY COMPRESSED DATA | SECONDARY COMPRESSED DATA |
|---|---|---|---|
| N 1 | x 1, y 1, z 1 | P 1 1 | P 2 1 |
| N 2 | x 2, y 2, z 2 | P 1 2 | P 2 2 |
| ⋮ | ⋮ | ⋮ | ⋮ |

REFERENCE CASE

THREE-DIMENSIONAL DATA PROCESSING SYSTEM

CROSS-REFERENCE TO RELATED APPLICATIONS

The present application is a continuation of International application PCT/JP2007/055385, filed on Mar. 16, 2007, and claims priority to Japanese application No. 2006-074054, filed on Mar. 17, 2006, which are hereby incorporated by reference in their entirety.

FIELD OF THE INVENTION

The present invention relates to a three-dimensional data processing system that performs image recognition and object recognition by collating three-dimensional data and image data of a collation object with three-dimensional data of a reference object.

BACKGROUND OF THE INVENTION

In recent years, the development of three-dimensional shape measurement technology has enabled us to obtain the highly accurate three-dimensional data (called "3D data" hereinafter) of an object with non-geometrical and complex free-formed shape, and various fields such as graphics generation and image recognition system have started to utilize 3D data obtained by measuring the shape of a human body. Further, various three-dimensional data processing systems such as a storage system in which a large amount of 3D data is stored and recalled as necessary, a search system that quickly searches for desired data, and a system that performs object recognition by collating data with a group of stored 3D data have been proposed and put to practical use. For instance, an object collating apparatus that collates the image data of a collation object with the 3D data of a reference object registered in a storage device in advance is described in Patent Document 1.

The shape of a complex three-dimensional object such as a human body that cannot be described by combining geometric shapes such as cubes and cylinders is normally represented by an assembly of small planes of triangles and quadrilaterals called polygons that finely divide the surface of the object and is described by data expressing coordinate values of the vertex of each polygon in three-dimensional space. Further, the color information (texture) of the object surface is expressed by a luminance value as the color of each polygon vertex. As a typical expression of 3D data, there is a method in which a secondary coordinate system (s,t) is defined on the surface of the object just as latitude and longitude are defined on the surface of the earth, locations obtained by quantizing the coordinates at an appropriate interval are defined as the polygon vertices, and the three-dimensional coordinates and the color (r,g,b, luminance value) are stored as data. For instance, as shown in FIG. 11, a line that connects the gravity center of the object and a vertex is extended, and an intersection Q between the extended line and the surface of a sphere surrounding the object is derived. Then its latitude and longitude (s,t) are calculated. These values (s,t) are quantized at an appropriate interval and the (x,y,z) coordinates and the color information (r,g,b) of corresponding polygon vertices are stored. According to this method, the three-dimensional shape of an object and the color information of its surface are thought to be an image with each pixel having six elements or factors (x,y,z,r,g,b). Since three-dimensional coordinates have a wider range of values than the luminance value, the amount of three-dimensional data will be several times as much as the data of a luminance image having a resolution of the same level. For instance, if a surface area of 30 cm×30 cm is quantized at an interval of 1 mm, the vertex data will be a resolution of 300×300=90,000 points. If (x,y,z) are each described by two-byte data and (r,g,b) are described by one-byte data, the data amount will still be more than 800 kilobytes.

As described, compared to image data, the amount of three-dimensional data tends to be large, therefore data compression is used in order to reduce its size. Generally speaking, there are two kinds of data compression methods: reversible compression method that can accurately restore the original data from compressed data, although the data compression ratio is relatively low, and irreversible compression method that can achieve a high ratio of data compression while the restoration accuracy is not so high. Various kinds of the both methods are proposed or put into practice in order to reduce the amount of 3D data using polygons or a surface representation. For instance, a technology described in Patent Document 2 is a reversible compression technology. In this technology, a plurality of neighboring vertices are grouped and a reference point for each group is defined. The data amount is reduced by describing the groups using a data type having a small number of bits, taking advantage of the fact that the differentials from the reference points are small. Further, as an irreversible compression method, a method that deletes vertices in the order of the distance to an average polygon among neighboring polygons (from closest to farthest) until a specified thinning-out rate is achieved is proposed as described in Non-Patent Document 1.

Meanwhile, data compression techniques with the benefits of the both methods: high data compression ratio, which is the benefit of the irreversible compression method, and high accuracy, which is the benefit of the reversible compression method, are described in Patent Documents 3 or 4. In this technology, data obtained by compressing the original data using the irreversible compression method are called primary compressed data, data obtained by compressing the difference between data restored from the primary compressed data and the original data using the reversible compression method are called secondary compressed data, and a pair (or set) of the primary compressed data and the secondary compressed data becomes compressed data of the original data. This compression method will be called "hybrid compression method" hereinafter.

As a conventional technology that applies such a hybrid compression method to data processing, there is a data processing system described in Patent Document 5. In this system, when a search is performed on the compressed data, it is performed on the primary compressed data, and the search results are presented to the user in the form of data decompressed from the primary compressed data and the secondary compressed data (refer to Paragraph 64 in the document).

[Patent Document 1]
Japanese Patent Kokai Publication No. JP-P2002-157595A
[Patent Document 2]
Japanese Patent Kokai Publication No. JP-P2002-008060A
[Patent Document 3]
Japanese Patent Kokai Publication No. JP-A-63-045684
[Patent Document 4]
Japanese Patent Kokai Publication No. JP-A-10-290460
[Patent Document 5]
Japanese Patent Kokai Publication No. JP-A-10-285407
[Non-Patent Document 1]
W. J. Schroeder et al., "Decimation of Triangle Meshes," Computer Graphics, 26, 2, Jul. 1992, pp. 65-70.

SUMMARY OF THE DISCLOSURE

The disclosure contents of each of the documents listed above are incorporated herein by reference thereto.

FIG. 12 shows a data processing system in which a client device 200 and a server device 100 are connected to each other via a network 300, the 3D data of a collation object are transmitted from the client device 200 to the server device 100, the server device 100 collates them with the 3D data of each reference object stored in a storage device 102, and the 3D data of several reference objects of higher similarities are displayed as candidate data on a display device 206 of the client device 200. Further, the 3D data of the reference objects are stored in the storage device 102 as compressed data because the amount of the necessary storage capacity will be too large otherwise. At this time, the following problems occur, depending on the data compression method used.

First, if the irreversible compression method is used, the storage capacity required for the storage device 102 can be small since a high data compression ratio can be achieved, however, the accuracy of the collation between the 3D data of the collation object and the 3D data of the original reference objects will deteriorate because the 3D data of the original reference objects cannot be restored accurately.

Next, if the reversible compression method is used, the accuracy of the collation between the 3D data of the collation object and the 3D data of the original reference objects will increase because the 3D data of the original reference objects can be restored accurately, however, the storage capacity required for the storage device 102 will be large since the method can only achieve a low data compression ratio. Further, when the 3D data of several reference objects of higher similarities are transmitted from the server device 100 to the client device 200 as candidate data, the amount of the transmitted data is larger than the case of the irreversible compression method (despite the fact that the data are sent as compressed data) and this will result in longer transmission time. This will further delay the processing thereafter such as the display of the candidate data on the display device 206 of the client device 200.

Finally, if the hybrid compression method is used, the collation accuracy will be high since the primary compressed data and the secondary compressed data are used to accurately restore the 3D data of the original reference objects and the storage capacity required for the storage device 102 can be small because of its relatively high data compression ratio. Therefore, the amount of the transmitted data is small when the candidate data are transmitted from the server device 100 to the client device 200.

For instance, if the amount of the primary compressed data be one tenth of the original data and that of the secondary compressed data be one half, the original data will be reduced to six tenths of the original size as a whole. (This depends on the technique used in the hybrid compression method.) As a result, the storage capacity and the amount of the transmitted data can be reduced to six tenths of what the size would be in the case where the 3D data are stored and transmitted without being compressed. However, if the original data be high-definition 3D data, the amount will be larger than 1 megabytes. As a result, the amount of the transmitted data will still be large even if it is compressed to six tenths of the original size.

Further, in the data processing system described in Patent Document 5 that applies the hybrid compression method to data processing, when a search is performed on the compressed data, it is performed on the primary compressed data, and the search results are presented to the user in the form of data decompressed from the primary compressed data and the secondary compressed data. If this system is applied to the data processing system in FIG. 12, the 3D data of the collation object will be collated with the primary compressed data, and the candidate data will be presented in the form of data decompressed from the primary compressed data and the secondary compressed data. Therefore, as in the case of the irreversible compression method, the accuracy of the collation between the 3D data of the collation object and the 3D data of the original reference objects will deteriorate. Further, since the candidate data will be the decompressed data from the primary compressed data and the secondary compressed data, the amount of the transmitted data will be large accordingly.

The present invention has been proposed to solve the problems described above. It is an object of the present invention to provide a three-dimensional data processing system capable of performing a collating operation highly precisely and drastically reducing the quantity of data necessary for presenting candidate data.

A three-dimensional data processing system relating to the present invention comprises a storage device that stores three-dimensional data of each reference object in a set of primary compressed data prepared by compressing the three-dimensional data in an irreversible compression method and secondary compressed data for compensating difference (i.e., change) between three-dimensional data restored from the primary compressed data and the original three-dimensional data; a collating unit that collates three-dimensional data decompressed from the primary compressed data and the secondary compressed data of each reference object with collation object data, which are three-dimensional data or image data of a collation object; and a candidate display unit that decompresses the primary compressed data of several reference objects of higher similarities included in collation results and displaying the decompressed data on a display device.

In the three-dimensional data processing system relating to the present invention, the secondary compressed data may be prepared by compressing difference (i.e., change) between the three-dimensional data restored from the primary compressed data and the original three-dimensional data.

The three-dimensional data processing system relating to the present invention may comprise a server device and a client device connected to each other via a network, the server device may comprise the storage device and the collating unit, and the client device may comprise a candidate display unit.

In the three-dimensional data processing system relating to the present invention, a compression method in which the coupling coefficients for synthesizing certain three-dimensional data by linear-combining a plurality of basic three-dimensional data become the compressed data of the certain three-dimensional data may be used as the irreversible compression method.

In the three-dimensional data processing system relating to the present invention, the client device may comprise a secondary decompression unit that obtains secondary compressed data of a reference object, requested by a user, from the server device and generates high-definition three-dimensional data by adding the secondary compressed data to the three-dimensional data decompressed from the primary compressed data of the reference object.

In the three-dimensional data processing system relating to the present invention, the client device may comprise a verification unit that verifies whether or not the collation object data and the three-dimensional data generated by the secondary decompression unit match.

In a three-dimensional data processing method relating to the present invention, a client device transmits collation object data, which are three-dimensional data or image data of a collation object, to a server device via a network; the server device collates the collation object data with three-dimensional data of each reference object decompressed from primary compressed data and secondary compressed data of each reference object read out from a storage device that stores three-dimensional data of each reference object in a set of the primary compressed data prepared by compressing the three-dimensional data in an irreversible compression method and the secondary compressed data for compensating difference (i.e., change) between three-dimensional data restored from the primary compressed data and the original three-dimensional data, and transmits the primary compressed data of several reference objects of higher similarities to the client device via the network; and the client device decompresses the received primary compressed data and displays the decompressed data on a display device.

In the three-dimensional data processing method relating to the present invention, the secondary compressed data may be prepared by compressing difference (i.e., change) between the three-dimensional data restored from the primary compressed data and the original three-dimensional data.

In the three-dimensional data processing method relating to the present invention, a compression method in the compression method, the coupling coefficients for synthesizing certain three-dimensional data by linear-combining a plurality of basic three-dimensional data becoming the compressed data of the certain three-dimensional data may be used as the irreversible compression method.

A server device of the present invention comprises: a storage device that stores three-dimensional data of each reference object in a set of primary compressed data prepared by compressing the three-dimensional data in an irreversible compression method and secondary compressed data for compensating difference (i.e., change) between three-dimensional data restored from the primary compressed data and the original three-dimensional data; and a processing device that receives collation object data, which are three-dimensional data or image data of a collation object, from a client device via a network, collates three-dimensional data decompressed from the primary compressed data and the secondary compressed data of each reference object with the received collation object data, and transmits the primary compressed data of several reference objects of higher similarities to the client device via the network.

In the server device of the present invention, the secondary compressed data may be prepared by compressing difference between the three-dimensional data restored from the primary compressed data and the original three-dimensional data.

A client device of the present invention comprises: a collation request unit that transmits a collation request including collation object data, which are three-dimensional data or image data of a collation object, to a server device via a network; receiving primary compressed data prepared by compressing three-dimensional data of a reference object similar to the collation object data in an irreversible compression method from the server device, decompressing the primary compressed data, and displaying the decompressed data on a display device.

The client device of the present invention may further comprise secondary decompression unit that obtains secondary compressed data of the reference object from the server device and generates high-definition three-dimensional data by adding the secondary compressed data to three-dimensional data decompressed from primary compressed data of the reference object.

The client device of the present invention may further comprise a verification unit that verifies whether or not the collation object data and the three-dimensional data generated by the secondary decompression unit match.

A program of the present invention has a computer, comprising a storage device that stores three-dimensional data of each reference object in a set of primary compressed data prepared by compressing the three-dimensional data in an irreversible compression method and secondary compressed data for compensating difference (i.e., change) between three-dimensional data restored from the primary compressed data and the original three-dimensional data, function as unit that receives collation object data, which are three-dimensional data or image data of a collation object, from a client device via a network; a unit that collates three-dimensional data decompressed from the primary compressed data and the secondary compressed data of each reference object with the collation object data received; and a unit that transmits primary compressed data of several reference objects of higher similarities to the client device via the network.

In the program of the present invention, the secondary compressed data may be prepared by compressing the difference between the three-dimensional data restored from the primary compressed data and the original three-dimensional data.

The program of the present invention has a computer function as a unit that transmits a collation request that includes collation object data, which are three-dimensional data or image data of a collation object, to a server device via a network; and a unit that receives primary compressed data prepared by compressing three-dimensional data of a reference object similar to the collation object data in an irreversible compression method from the server device, decompressing the primary compressed data, and displaying the decompressed data on a display device.

The program of the present invention may have the computer further function as a secondary decompression unit that obtains secondary compressed data of the reference object from the server device and generates high-definition three-dimensional data by adding the secondary compressed data to three-dimensional data decompressed from primary compressed data of the reference object.

The program of the present invention may have the computer further function as a verification unit for verifying whether or not the collation object data and the three-dimensional data generated by the secondary decompression unit match.

Further, the secondary compressed data in the conventional technology (the hybrid compression method) are prepared by compressing the difference between three-dimensional data restored from the primary compressed data and the original three-dimensional data, however, the secondary compressed data in the present invention are not limited to the difference between such data and may be calculated separately.

[Function]

In the present invention, the three-dimensional data of reference objects are compressed in a hybrid compression method and stored in a storage device, and the collation accuracy is increased by using three-dimensional data restored from the primary compressed data and the secondary compressed data in collation with the collation object data of a collation object. The amount of data required for presenting candidate data can be drastically reduced by using three-dimensional data restored only from the primary compressed data as the candidate data.

The meritorious effects of the present invention are summarized as follows.

According to the present invention, in a data processing system that collates the three-dimensional data of each reference object with collation object data and presents the three-dimensional data of several reference objects of higher similarities to the user as candidate data, the collation accuracy can be increased and the data amount required to present the candidate data can be drastically reduced. The reason is that three-dimensional data restored from the primary compressed data and the secondary compressed data are used in collation with the collation object data and three-dimensional data restored only from the primary compressed data are used as the candidate data.

Further, regarding the display quality of the display device, since a slight deterioration in image quality is hardly noticeable to the user as long as the image quality meets certain standards, the user will not be bothered even if the candidate data restored only from the primary data are displayed, compared with the case where the candidate data restored from both the primary compressed data and the secondary compressed data are displayed.

BRIEF DESCRIPTIONS OF THE DRAWINGS

FIG. 3 shows an example of a data storage format for the compressed data of reference objects in the three-dimensional data processing system relating to the first example of the present invention.

EXPLANATIONS OF SYMBOLS

Figure 1:
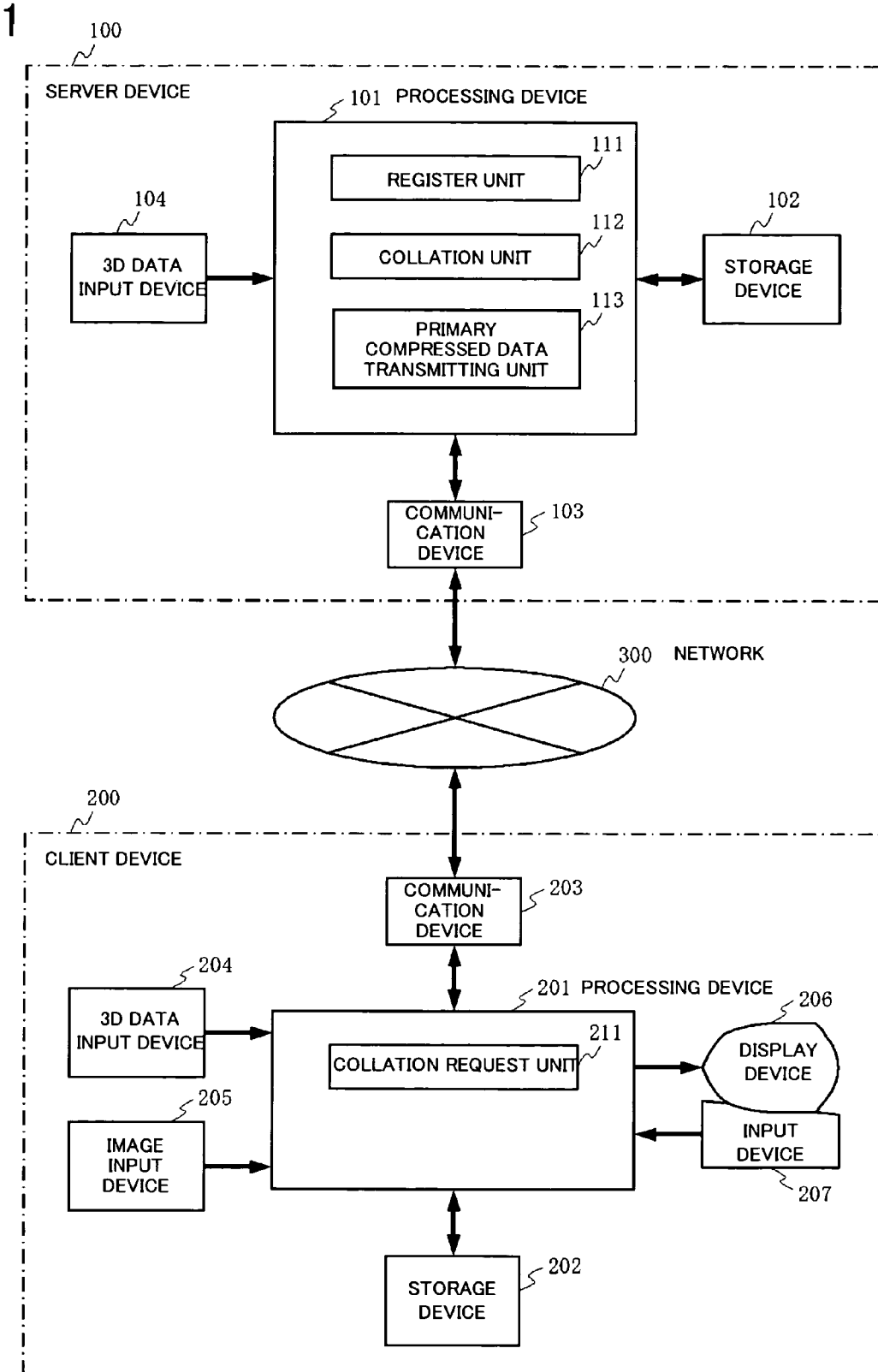
FIG. 1 is a block diagram of a three-dimensional data processing system relating to a first example of the present invention.

100: server device
101: processing device
102: storage device
103: communication device
111: register unit
112: collation unit
113: primary compressed data transmitting unit
114: secondary compressed data transmitting unit
200: client device
201: processing device
202: storage device
203: communication device
204: three-dimensional data input device
205: image input device
206: display device
207: input device
211, 212: collation request unit
213: verification unit

PREFERRED MODES OF THE INVENTION

Next, preferred modes for carrying out the present invention will be described in detail with reference to the drawings.

First Example

Referring to FIG. 1, in a three-dimensional data processing system relating to a first example of the present invention, a server device 100 and a client device 200 are connected to each other via a network 300 so that they can communicate with each other.

The server device 100 is constituted by a processing device 101, a storage device 102 connected to the processing device 101, a communication device 103, and a three-dimensional data input device 104.

The storage device 102 is made up of a magnetic disk device and stores programs and various data. The stored data include the three-dimensional data of each reference object compressed using the hybrid compression method.

The communication device 103 is made up of a network interface card (NIC) and transmits/receives data to/from the client device 200 via the network 300.

The three-dimensional input device 104 is formed by a device that reads the three-dimensional data of reference objects from another computer or a storage medium (not shown in the drawing), and a device that measures the three-dimensional data of the reference objects, etc.

The processing device 101 is made up of a central processing unit of a computer operated by program control and performs main control of the server device 100. In the present example, the processing device 101 comprises a register unit 111, a collating unit 112, and a primary compressed data transmitting unit 113.

The resister unit 111 has the functions of compressing the three-dimensional data of the reference objects received from the three-dimensional data input device 104 using the hybrid compression method, and registering the data in the storage device 102.

The collating unit 112 has the functions of receiving a collation request that includes collation object data, which are either the three-dimensional data or the image data of a collation object, from the client device 200 via the network 300, collating the received data with the three-dimensional data of each reference object stored in the storage device 102, and returning collation results that include a list of several reference objects of higher similarities to the client device 200.

The primary compressed data transmitting unit 113 has the functions of reading data requested by the client device 200 via the network 300 out of the primary compressed data of each reference object stored in the storage device 102 from the storage device 102 and transmitting it to the client device 200.

Meanwhile, the client device 200 is formed by a processing device 201, a storage device 202 connected to the processing device 201, a communication device 203, a three-dimensional data input device 204, an image input device 205, a display device 206, and an input device 207.

The storage device 202 is made up of a magnetic disk device and stores programs and various data.

The communication device 203 is made up of a network interface card (NIC) and transmits/receives data to/from the server device 100 via the network 300.

The three-dimensional input device 204 is constituted by a device that reads the three-dimensional data of the collation object from another computer or a storage medium (not shown in the drawing) and a device that measures the three-dimensional data of the collation object.

The image input device 205 is constituted by a device that reads the image data of the collation object from another computer or a storage medium (not shown in the drawing), a scanner, and a camera that takes a photograph of the collation object.

The display device 206 is made up of a liquid crystal display device and presents various data to the user.

The input device 207 is constituted by a keyboard and a mouse and receives various commands and data from the user.

The processing device 201 is made up of the central processing unit of a computer operated by program control and performs main control of the client device 200. In the present example, the processing device 201 comprises a collation request unit 211.

The collation request unit 211 has the functions of transmitting a collation request that includes either the three-dimensional data of the collation object received from the three-dimensional data input device 204 or the image data of the collation object received from the image input device 205 as the collation object data to the server device 100 via the network 300, and displaying collation results on the display device 206 when it receives the collation results that include a list of several reference objects of higher similarities as a response to the request. Further, when the user selects any reference object on the list included in the collation results by operating the input device 207, the collation request unit 211 transmits a request to obtain the primary compressed data of the selected reference object to the server device 100 via the network 300, and when it receives the primary compressed data as a response to the request, the collation request unit 211 displays the three-dimensional data decompressed from the primary compressed data on the display device 206.

Next, the configuration and operation of the present example will be described in detail.

First, how the three-dimensional data of each reference object are compressed and stored in the storage device 102 of the server device 100 will be explained. This function is performed by the register unit 111 of the server device 100.

Figure 2:
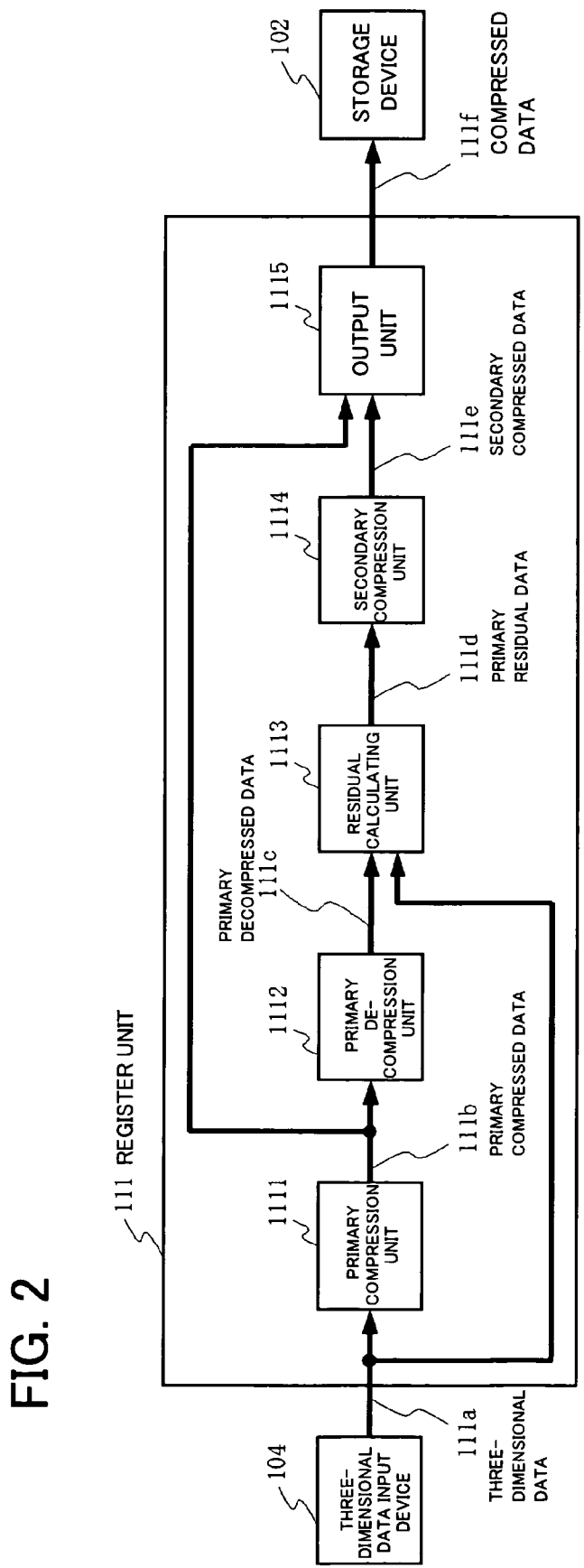
FIG. 2 is a block diagram showing a configuration example of a resister unit in the three-dimensional data processing system relating to the first example of the present invention.

Referring to FIG. 2, the register unit 111 is constituted by primary compression unit 1111, primary decompression unit 1112, residual calculating unit 1113, secondary compression unit 1114, and output unit 1115, and operates as described below.

When the register unit 111 receives the three-dimensional data of a reference object from the three-dimensional data input device 104, it sends the data to the primary compression unit 1111 and the residual calculating unit 1113.

The primary compression unit 1111 data-compresses the three-dimensional data received using a predetermined irreversible compression method and outputs the result to the primary decompression unit 1112 and the output unit 1115 as primary compressed data 111$b$.

The primary decompression unit 1112 decompresses the primary compressed data 111$b$ using a predetermined data decompression method and outputs the result to the residual calculating unit 1113 as primary decompressed data 111$c$. The primary compressed data 111$b$ are compressed using the irreversible compression method, therefore the primary decompressed data 111$c$ do not completely match the original three-dimensional data 111$a$.

The residual calculating unit 1113 calculates primary residual data 111$d$, which are the difference (i.e., change) between the primary decompressed data 111$c$ and the original three-dimensional data 111$a$, and outputs them to the secondary compression unit 1114. The primary residual data 111$d$ have the same number of vertices as the original three-dimensional data 111$a$, and the three-dimensional coordinate and texture luminance of each vertex is the difference (i.e., change) between the values of corresponding vertices of the original three-dimensional data 111$a$ and the primary decompressed data.

The secondary compression unit 1114 data-compresses the primary residual data 111$d$ using a predetermined reversible compression method and outputs the result to the output unit 1115 as secondary compressed data 111$e$.

The output unit 1115 gives a name to a pair of the primary compressed data 111$b$ and the secondary compressed data 111$e$ and stores it, together with its name or identification as the compressed data 111$f$ of the original three-dimensional data 111$a$ in the storage device 102. At this time, attribute data that explain each three-dimensional data may be stored together as metadata. FIG. 3 shows an example of compressed data storage format. In this example, compressed data are stored in table format and a row in the table corresponds to one piece of three-dimensional data, storing the data name, the metadata, the primary compressed data, and the secondary compressed data. It should be noted that the compressed data storage format is not limited to the example in FIG. 3 and any formulation may be employed.

Next, how the collation object data, which are either the three-dimensional data or the image data of the collation object, are transmitted from the client device 200 to the server device 100, the server device 100 collates the collation object data with the three-dimensional data of each reference object stored in the storage device 102, and the three-dimensional data of several reference objects of higher similarities are displayed as the candidate data on the display device 206 of the client device 200 are explained. These functions are performed by the collating unit 112 and the primary compressed data transmitting unit 113 of the server device 100 and the collation request unit 211 of the client device 200.

Figure 4:
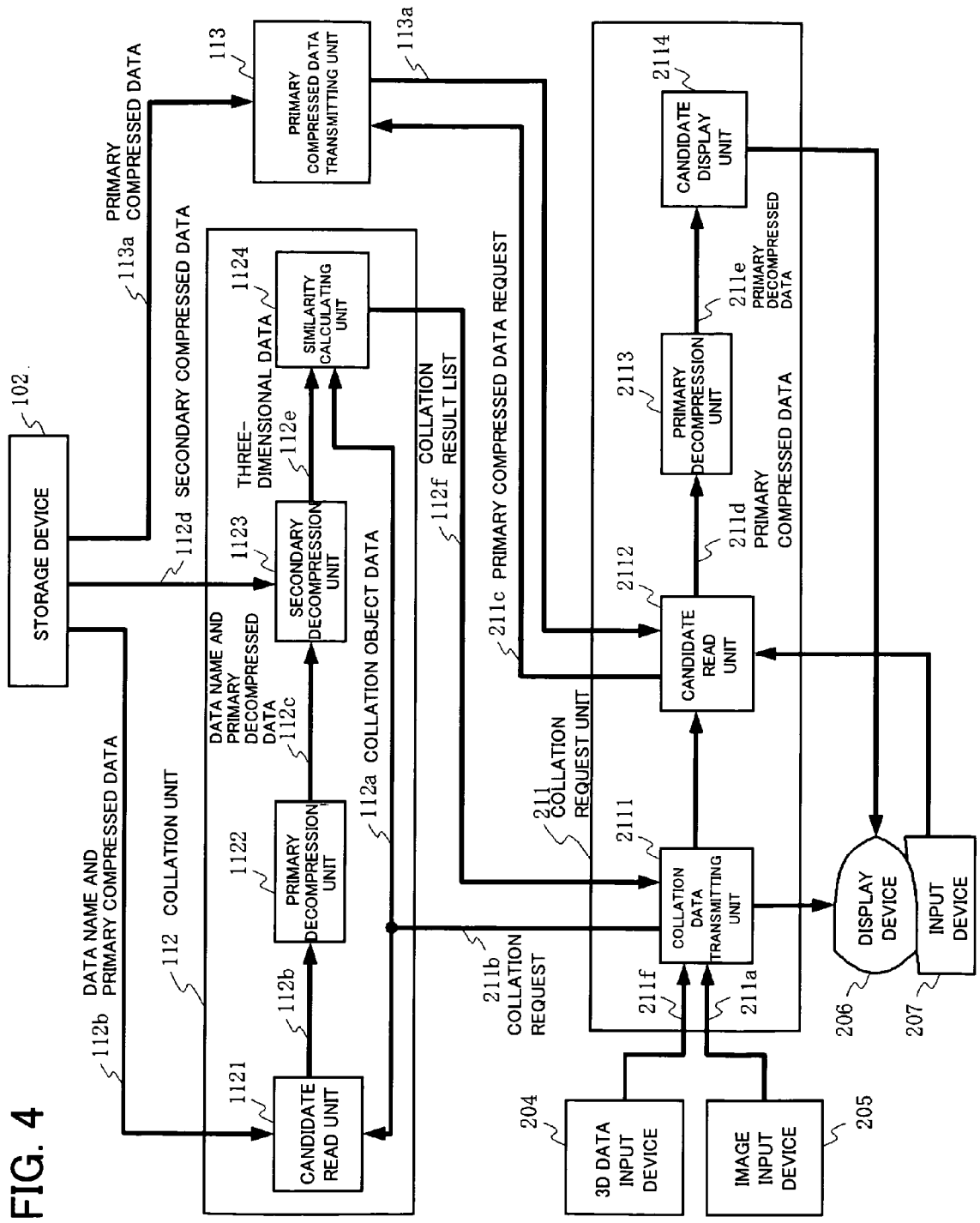
FIG. 4 is a block diagram showing a configuration example of a section related to collation in the three-dimensional data processing system relating to the first example of the present invention.

Referring to FIG. 4, the collation request unit 211 of the client device 200 is constituted by collation data transmitting unit 2111, candidate read unit 2112, primary decompression unit 2113, and candidate display unit 2114, and the collating unit 112 of the server device 100 is constituted by candidate read unit 1121, primary decompression unit 1122, secondary decompression unit 1123, and similarity calculating unit 1124.

When the collation data transmitting unit 2111 in the collation request unit 211 of the client device 100 receives the image data 211a of the collation object from the image input device 205 by a user operation, it transmits a collation request 211b that includes the image data 211a as the collation object data to the collating unit 112 of the server device 100 via the network 300. The collation request 211b may include metadata for narrowing down reference objects, in addition to the collation object data.

When the collating unit 112 of the server device 100 receives the collation request 211b, it notifies the candidate read unit 1121 and sends collation object data 112a included in the collation request 211b to the similarity calculating unit 1124. Further, if the metadata is included in the collation request 211b, the collating unit 112 will send it to the candidate read unit 1121.

The candidate read unit 1121 reads out the data name and the primary compressed data 112b of each reference object from the storage device 102 and outputs them to the primary decompression unit 1122. At this time, when the metadata are provided, the reference objects with metadata that match the metadata given are searched from the storage device 102 and only the data names and the primary compressed data of these reference objects are read out. For instance, assuming that the three-dimensional data are the three-dimensional data of human faces and one of the metadata indicates sex, if the provided metadata indicate female, only the data names and the primary compressed data of reference objects with metadata indicating female will be read out.

The primary decompression unit 1122 decompresses each of the primary compressed data 112b received, attaches the data name received to the decompressed data, and outputs the decompressed data to the secondary decompression unit 1123 as primary decompressed data 112c.

For each primary decompressed data 112c received, from the storage device 102, the secondary decompression unit 1123 reads out the secondary compressed data 112d of a reference object having the same data name as the one attached to the primary decompressed data 112c, restores the primary residual data by decompressing the data, and restores the three-dimensional data 112e of the reference object by adding the residual data to the primary decompressed data 112c. The restored three-dimensional data 112e of each reference object is outputted to the similarity calculating unit 1124.

The similarity calculating unit 1124 collates the image data of the collation object provided by the collation object data 112a with the three-dimensional data of each reference object restored by the secondary decompression unit 1123, and calculates the degree of similarity between them. The technology of collating image data with three-dimensional data, for instance, proposed in Patent Document 1, can be employed. Then a collation result list 112f that lists the data names of a predetermined number of reference objects indicating a degree of similarity higher than a predetermined threshold value in the order of the degree of similarity (high to low) is generated and transmitted to the collation request unit 211 of the client device 200, which made the collation request, via the network 300. Note that the calculation of the degree of similarity may be performed factoring in the metadata given to the collation object data. For instance, if metadata indicating the age of thirties are given, the calculation may be corrected so that the degree of similarity with reference objects with metadata indicating the age of thirties will be high.

When the collation request unit 211 of the client device 200 receives the collation result list 112f, it displays the list on the display device 206 and sends it to the candidate read unit 2112. The user of the client device 200 is able to know the data names of the reference objects similar to the image data 211a of the collation object in the order of similarity from the collation result list 112f displayed on the display device 206. When the user wants to see the three-dimensional data of these reference objects displayed on the display device 206, he can request that the three-dimensional data be displayed by selecting a data name on the collation result list 112f via the input device 207. In response to this request, the candidate read unit 2112 transmits a primary compressed data request 211c that includes the selected data name to the primary compressed data transmitting unit 113 of the server device 100 via the network 300.

From the storage device 102, the primary compressed data transmitting unit 113 of the server device 100 reads out the primary compressed data 113a of the reference object having the data name included in the primary compressed data request 211c and transmits it to the candidate read unit 2112, which made the request.

The candidate read unit 2112 outputs the primary compressed data 113a received to the primary decompression unit 2113 as primary compressed data 211d. The primary decompression unit 2113 decompresses this primary compressed data 211d and outputs the result to the candidate display unit 2114 as primary decompressed data 211e. The candidate display unit 2114 displays the three-dimensional image of the reference object represented by the primary decompressed data 211e on the display device 206. As a result, the user of the client device 200 is able to see and confirm the shape of the reference object that has been determined to be similar to the collation object.

When the user cannot obtain a desired collation result, he can return to the processing of the collation data transmitting unit 2111 where it is possible to perform a collation again after changing or correcting metadata and changing the image data as the collation object.

As described above, according to the present example, the collation performance will not deteriorate because the collation processing for the image data of the collation object is performed using the highly precise, original three-dimensional data decompressed from the secondary compressed data. Further, since only the primary compressed data are transmitted to the client device 200, the amount of the transmitted data is small and the display of the collation results can be performed at high speed. Therefore, the user can instantly evaluate the collation results and perform a collation again, and as a result, he is able to obtain accurate collation results quickly.

In the above description, the image data supplied by the image input device 205 are the collation object data, however, the collation object data may be three-dimensional data supplied by the three-dimensional data input device 204 or data including both the image data and the three-dimensional data.

Further, in the above description, the primary compressed data of the candidate reference objects are transmitted from the server device 100 to the client device 200 after the collation result list is transmitted from the server device 100 to the client device 200 and the client device 200 transmits the primary compressed data request specifying a data name on the collation result list to the server device 100, however, the server device 100 may transmit the collation result list and the primary compressed data of the candidate reference objects included on the collation result list to the client device 200 simultaneously.

Further, the server device 100 comprises the register unit 111 that compresses the three-dimensional data of reference objects and registers the compressed data in the storage device 102 in the above description, however, another computer may be used to generate the compressed data, which will be stored in the storage device 102. In this case, the register unit 111 and the three-dimensional data input device 104 may be omitted from the server device 100.

Next, a primary compression method, a secondary compression method and their respective decompression method used in the present example will be described.

Primary Compression Method and its Decompression Method

Example 1

Figure 5:
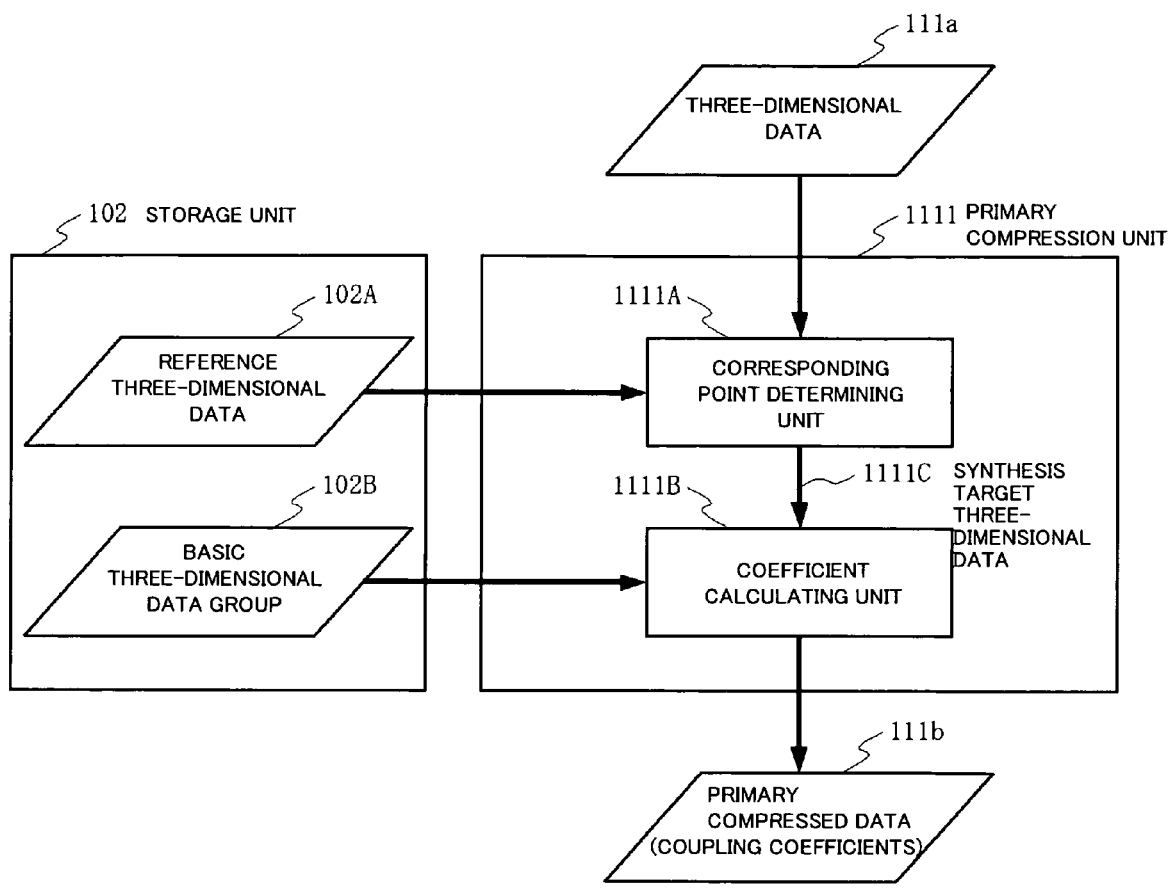
FIG. 5 is a block diagram showing a configuration example of a primary compression unit in the three-dimensional data processing system relating to the first example of the present invention.

A primary compression method of this example is suitable for compressing and storing numerous pieces of data with similar structures such as the three-dimensional data of various human faces. Referring to FIG. 5, a primary compression unit 1111, to which the primary compression method of the present example is applied, is constituted by corresponding point determining unit 1111A and coefficient calculating unit 1111B. Further, reference three-dimensional data 102A and basic three-dimensional data group 102B are stored as data used for primary compression in the storage device 102.

In the primary compression method of the present example, since the coupling coefficients for synthesizing three-dimensional data by linear-combining a plurality of three-dimensional data become the compressed data of the three-dimensional data synthesized, it is necessary to relate the vertices of the plurality of three-dimensional data used in the synthesizing to those of the three-dimensional data being synthesized.

The reference three-dimensional data 102A stored in the storage device 102 serve as the reference for determining the corresponding relationship between vertices. Further, the basic three-dimensional data group 102B corresponds to the plurality of three-dimensional data used in the synthesizing. Each piece of the basic three-dimensional data is the three-dimensional data generated by relating the vertices of the reference three-dimensional data 102A to those of three-dimensional data of an object, or the basic data derived from three-dimensional data of numerous objects, generated as described, by a calculation such as a principal component analysis.

The corresponding point determining unit 1111A of the primary compression unit 1111 creates synthesis target three-dimensional data 1111C in which the vertices of the reference three-dimensional data 102A are related to those of the three-dimensional data 111a received. Further, the coefficient calculating unit 1111B calculates the coupling coefficients for synthesizing the synthesis target three-dimensional data 1111C by combining a plurality of basic three-dimensional data included in the basic three-dimensional data group 102B, and outputs the calculated coupling coefficients as the primary compressed data 111b of the three-dimensional data 111a.

The operation of the primary compression unit 1111 of the present example will be described in detail.

It is possible to compress various kinds of the three-dimensional data 111a of the reference object, however, an example in which the three-dimensional data of human faces are compressed will be described here. Further, the three-dimensional data 111a are constituted by polygon data having a three-dimensional coordinate and a luminance value of the texture (surface color) image for each vertex. For instance, when the number of vertices is 100,000, each (x,y,z) value of the three-dimensional coordinate is represented by a 16-bit floating point number, and each rgb value of the texture luminance is represented by an 8-bit integer, the data amount of the three-dimensional data 111a is 100,000×(3×2+3×1) bytes, i.e., approximately 900 kilobytes.

First, the corresponding points determining unit 1111A reads out the reference three-dimensional data 102A, which are the reference for determining the corresponding relationship between vertices, from the storage device 102. For instance, we will assume that the reference three-dimensional data 102A have 90,000 vertices, the three-dimensional coordinate using [mm] as the unit is represented by three 16-bit floating point numbers (as in the three-dimensional data 111a), and the texture luminance value is represented by three (rgb) 8-bit integers (from 0 to 255 inclusive). When the three-dimensional coordinate of the ith vertex of the reference three-dimensional data 102A is $(x_{ri}, y_{ri}, z_{ri})$ and the texture luminance value is $(r_{ri}, g_{ri}, b_{ri})$, the reference three-dimensional data 102A are expressed as a piece of vector data in which the coordinate value and the luminance value of each vertex is listed as the three-dimensional shape data and the texture image data respectively:

$$S_r = [x_{r1}, y_{r1}, z_{r1}, x_{r2}, y_{r2}, z_{r2}, \ldots, x_{r90000}, y_{r90000}, z_{r90000}] \quad (1)$$

$$T_r = [r_{r1}, g_{r1}, b_{r1}, r_{r2}, g_{r2}, b_{r2}, \ldots, r_{r90000}, g_{r90000}, b_{r90000}] \quad (2)$$

Next, the corresponding point determining unit 1111A determines which vertex of the three-dimensional data 111a corresponds to each vertex of the reference three-dimensional data 102A. Various methods can be employed to do this, but for instance, a method that searches for the vertex having the closet three-dimensional coordinate and texture luminance value can be used. For example, when the three-dimensional coordinate of the jth vertex of the three-dimensional data 111a is $(x_{tj}, y_{tj}, z_{tj})$, and the texture luminance is $(r_{tj}, g_{tj}, b_{tj})$, a cost function C is defined by the following equation.

$$C(i,j) = \{(x_{ri}-x_{tj})^2 + (y_{ri}-y_{tj})^2 + (z_{ri}-z_{tj})^2\} + w\{(r_{ri}-r_{tj})^2 + (g_{ri}-g_{tj})^2 + (b_{ri}-b_{tj})^2\} \quad (3)$$

The vertex of the three-dimensional data 111a that corresponds to the ith vertex (i=1, . . . , 90,000) of the reference three-dimensional data 102A can be determined by searching for a vertex j that minimizes the cost function C(i,j) from the vertices of the three-dimensional data 111a. Further, the accuracy can be increased by searching for a plurality of vertices with small C values and defining the vertex with the mean value as the corresponding point. For the weight w, various values may be used, but for instance, w=1.0.

The synthesis target three-dimensional data 1111C, which are the three-dimensional data 111a with the corresponding points determined, are expressed as a piece of vector data in which the coordinate value and the luminance values of each vertex are listed as the three-dimensional shape data and the texture image data respectively. In other words, when a vertex of the three-dimensional data 111a that corresponds to a vertex i of the reference three-dimensional data 102A is j(i), the shape and texture of the synthesis target three-dimensional data 1111C are expressed by the following vectors ($S_t$, $T_t$).

$$S_t = [x_{rj(1)}, y_{rj(1)}, z_{rj(1)}, x_{rj(2)}, y_{rj(2)}, z_{rj(2)}, \ldots, \\ x_{rj(90000)}, y_{rj(90000)}, z_{rj(90000)}] \quad (4)$$

$$T_t = [r_{rj(1)}, g_{rj(1)}, b_{rj(1)}, r_{rj(2)}, g_{rj(2)}, b_{rj(2)}, \ldots, r_{rj(90000)}, \\ g_{rj(90000)}, b_{rj(90000)}] \quad (5)$$

Next, the coefficient calculating unit 1111B reads out the basic three-dimensional data group 102B, which is the three-dimensional data group of a predetermined sufficient number of objects. The basic three-dimensional data group 102B may be any of the following types.

a) Three-dimensional data type: all pieces of the basic three-dimensional data constituting the basic three-dimensional data group 102B use the three-dimensional data of human faces.

b) Basic data type: all pieces of the basic three-dimensional data constituting the basic three-dimensional data group 102B are the basic data derived from the three-dimensional data of collected numerous human faces by a calculation. For instance, the basic data obtained by the mean three-dimensional data and a principal component analysis can be used.

c) Mixed type: Some of the basic three-dimensional data constituting the basic three-dimensional data group 102B are the basic data derived from the three-dimensional data of collected numerous human faces by a calculation, and the rest of the basic three-dimensional data are the three-dimensional data of human faces.

Regardless of the type of the data, the same corresponding point determining processing as the one on the three-dimensional data 111a has been performed on the basic three-dimensional data group 102B. Here, we will assume that the basic three-dimensional data group 102B of the three-dimensional data type is used. The three-dimensional shape and texture of the basic three-dimensional data group 102B are expressed by vectors, and when a vertex that corresponds to a vertex j of the reference three-dimensional data 102A is j(i), the three-dimensional shape $S_{bk}$ and the texture $T_{bk}$ of the kth basic three-dimensional data are expressed as follows.

$$S_{bk} = [x_{bkj(1)}, y_{bkj(1)}, z_{bkj(1)}, x_{bkj(2)}, y_{bkj(2)}, z_{bkj(2)}, \ldots, \\ x_{bkj(90000)}, y_{bkj(90000)}, z_{bkj(90000)}] \quad (6)$$

$$T_{bk} = [r_{bkj(1)}, g_{bkj(1)}, b_{bkj(1)}, r_{bkj(2)}, g_{bkj(2)}, b_{bkj(2)}, \ldots, \\ r_{bkj(90000)}, g_{bk(90000)}, b_{bkj(90000)}] \quad (7)$$

The larger the amount of the basic three-dimensional data is, the more accurate the three-dimensional data restored from the compressed data become, however, the calculation amount and storage capacity also increase. Here, as an example, we will use the three-dimensional data of one hundred human faces collected beforehand.

Next, the coefficient calculation unit 1111B calculates coefficients for synthesizing the synthesis target three-dimensional data 1111C using the basic three-dimensional data group 102B. When n pieces of the basic three-dimensional data are used (for instance, n=100), coefficients $\{\alpha_{sk}\}$, $\{\alpha_{tk}\}$ (k=1, ..., 100) that describe the shape and texture of the synthesis target three-dimensional data 1111C (n coefficients each) are derived using the following linear least square method.

$$\{\alpha_{sk}\} = \mathrm{argmin} \left| S_t - \sum_{k=1}^{100} (\alpha_{sk} S_{bk}) \right|^2 \quad (8)$$

$$\{\alpha_{tk}\} = \mathrm{argmin} \left| T_t - \sum_{k=1}^{100} (\alpha_{tk} T_{bk}) \right|^2 \quad (9)$$

Next, the coefficient calculating unit 1111B outputs the calculated coefficient data $\{\alpha_{sk}\}$, $\{\alpha_{tk}\}$ as the primary compressed data 111b of the three-dimensional data 111a. For instance, when the coefficient data is derived as 16-bit floating point numbers, the amount of the coefficient data is 2×100×2=400 bytes.

Next, a configuration example of the primary decompression unit 1112 that decompresses the primary compressed data 111b generated by the primary compression unit 1111. The primary decompression unit 2113 of the client device will have the same configuration as the primary decompression unit 1112.

Figure 6:
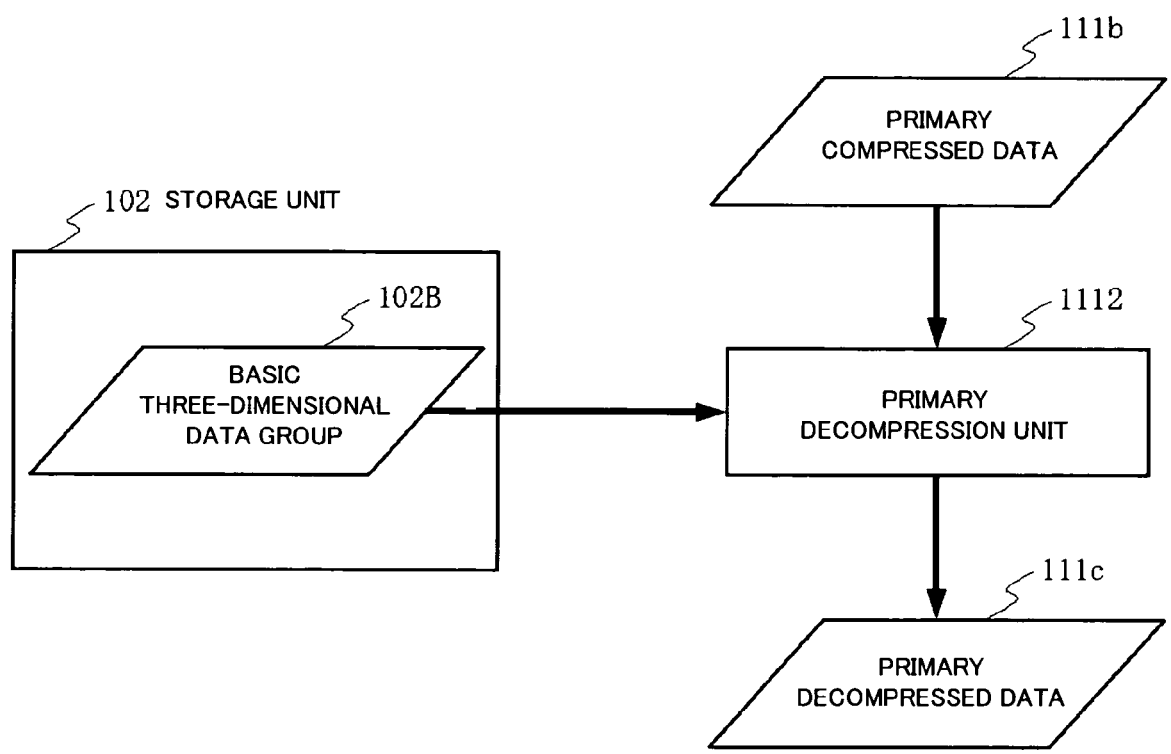
FIG. 6 is a block diagram showing a configuration example of a primary decompression unit in the three-dimensional data processing system relating to the first example of the present invention.

Referring to FIG. 6, the primary decompression unit 1112 receives the primary compressed data 111b, generates three-dimensional data by combining the basic three-dimensional data group 102B used for the compression using the coupling coefficients indicated by the primary compressed data 111b, and outputs them as the primary decompressed data 111c. When the primary compressed data 111b are $\{\alpha_{sk}\}$, $\{\alpha_{tk}\}$ (k=1, ..., 100), and the three-dimensional shape and texture of the basic three-dimensional data group 102B is $S_{bk}$ and $T_{bk}$ expressed by the equations (6) and (7), vectors $S_t'$ and $T_t'$ that represent the three-dimensional shape and texture of the restored three-dimensional data are calculated by the following equation.

$$S_t' = \sum_{k=1}^{100} (\alpha_{sk} S_{bk}) \quad (10)$$

$$T_t' = \sum_{k=1}^{100} (\alpha_{tk} T_{bk}) \quad (11)$$

As described, in the primary compression method of the present example, the coefficient data for restoring the three-dimensional data 111a are generated using the basic three-dimensional data group 102B as the primary compressed data of the three-dimensional data 111a, and since the data amount of the coefficient data is much smaller than three-dimensional data, a high data compression ratio can be achieved. In the example described above, while the size of the three-dimensional data 111a is 900 kilobytes, the size of the coefficient data (the primary compressed data) is only 400 bytes.

Further, in the primary compression method of the present example, since the restored three-dimensional data (the primary restored data) are calculated by combining the basic three-dimensional data group 102B and the number of vertices is the same as that of the basic three-dimensional data group 102B, the deterioration in resolution caused by a decrease in the number of vertices due to data compression and restoration is minimized despite the fact that a very high data compression ratio is achieved. In the example described above, the three-dimensional data before the compression have 100,000 vertices, and the restored three-dimensional data have 90,000 vertices since the compression target three-dimensional data also have 90,000 vertices.

It should be noted that the values used in the description above such as the vertex number of the input three-dimensional data, the amount of the basic three-dimensional data, the vertex number of the reference three-dimensional data, the amount of the shape data and the luminance data, and the number of bits are merely by way of examples and they may be changed. Further, the data primary compressed may be further compressed using methods such as the run-length encoding and Huffman coding. In this case, the run-length encoding or Huffman coding needs to be decoded before the primary decompression is performed.

Further, when the primary compression method of the present example is used, the residual calculating unit 1113 calculates the difference (i.e., change) between the restoration data of the corresponding vertices (the coordinates and the luminance values calculated using the equations (1) and (2)) determined in the corresponding point determining processing described above and the vertex data of the original three-dimensional data.

Primary Compression Method and its Decompression Method

Example 2

Another primary compression method that can be applied to the primary compression unit 1111 performs a data compression by reducing the number of polygon vertices as described below.

Figure 11:
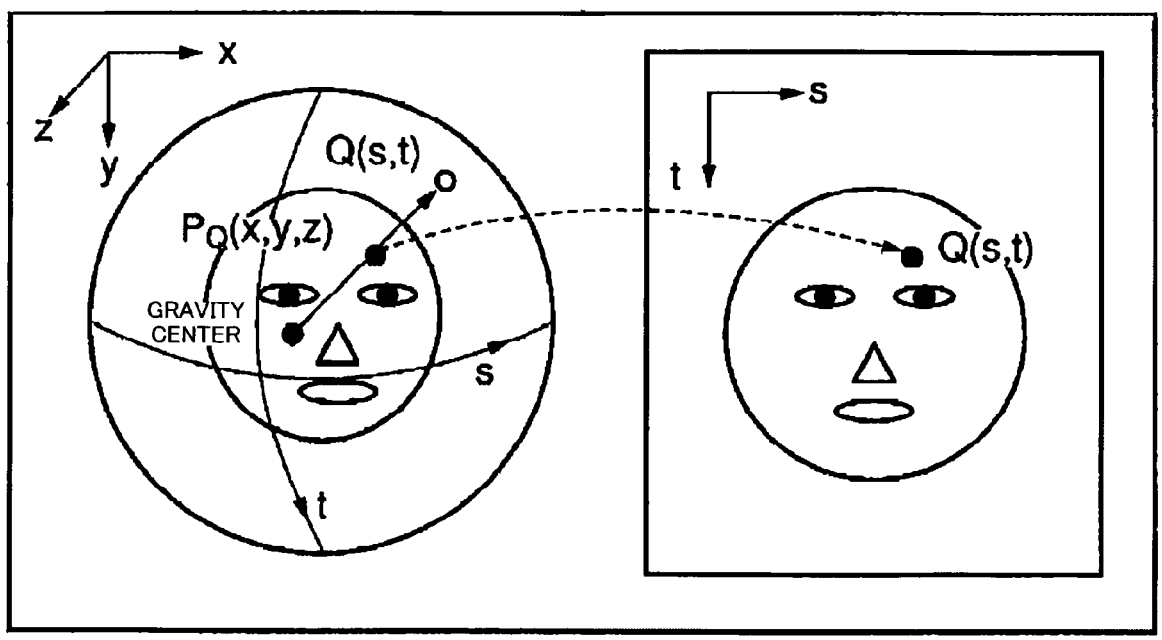
FIG. 11 is a figure for explaining an example of a method for describing three-dimensional data.
Figure 12:
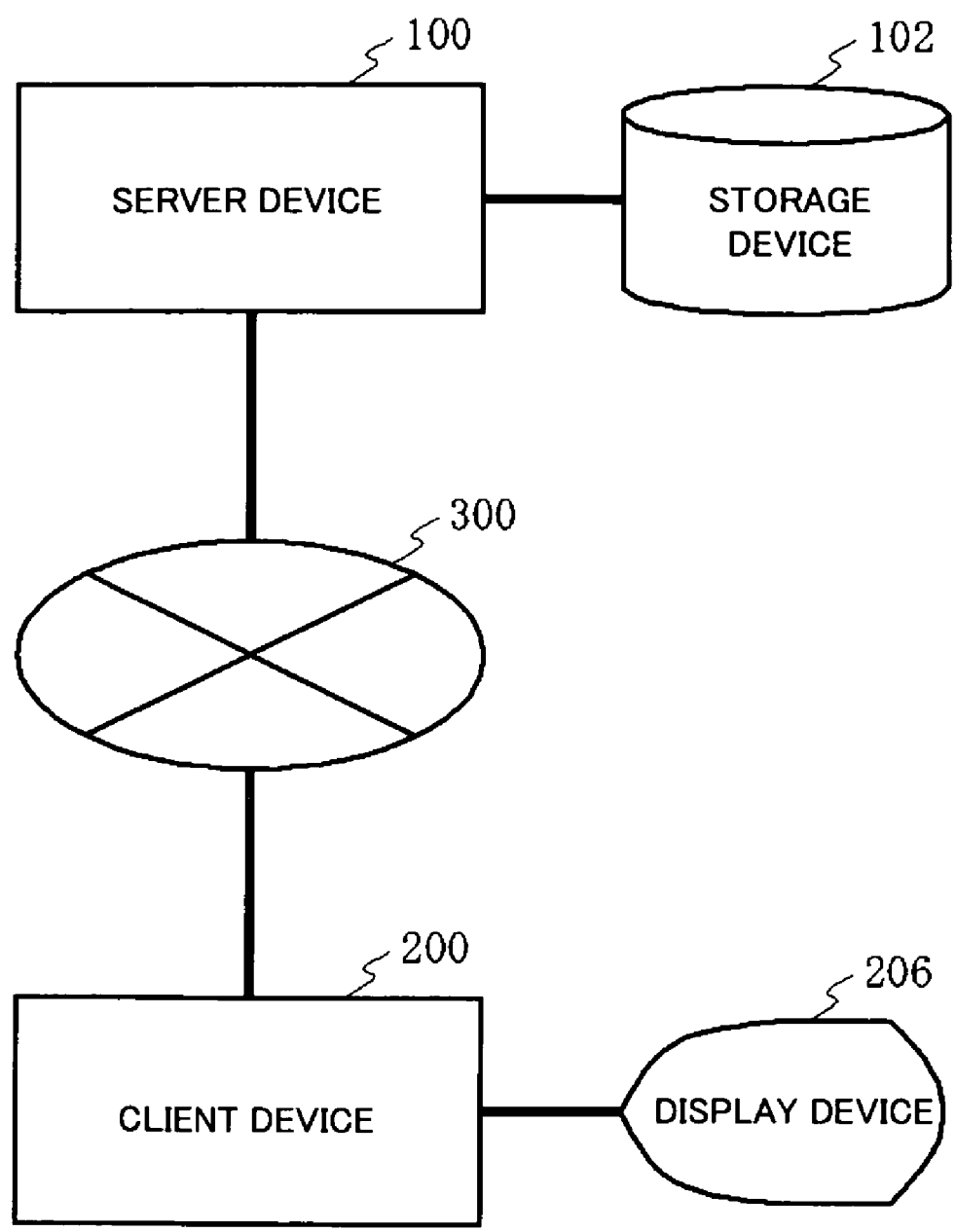
FIG. 12 is a figure for explaining problems to be solved by the present invention.

An example in which the three-dimensional data of human faces are used as the input data will be explained. Let's assume that the original three-dimensional data have 10,000 vertices. First, the mean value of the three-dimensional coordinates of all the vertices of the input three-dimensional data is calculated and defined as the center of gravity. Next, referring to FIG. 11, the intersection Q between the line extending from the center of gravity to each vertex P (x,y,z) and the surface of the sphere surrounding the input three-dimensional data with the center of gravity as the center is derived, and two-dimensional coordinate (s,t) (the latitude and longitude of Q on the sphere surface) is assigned to each vertex. This processing is performed on all the vertices, and let's assume that the distribution of Q is within $-90 \leq s \leq 90$ and $-90 \leq t \leq 90$. Here, the values of (s,t) are quantized from −90 to 90 at an interval of 5 degrees, all the vertices that correspond to the same two-dimensional quantized coordinate (s,t) are lumped together, the mean three-dimensional coordinates $(x_m, y_m, z_m)$ and the mean texture luminance values $(R_m, G_m, B_m)$ are calculated, and one reference point $Q_{ij}$ (5i, 5j) (i,j=0, 1, ..., 36) is defined for these vertices. By this processing, the number of the vertices are reduced to (180/5+1)*(180/5+1)=1,369 points (when there is no vertex corresponding to a particular $Q_{ij}$, the number is further reduced), therefore the original data amount of 10,000 points can be reduced to approximately one tenth. After this, the data primary compressed may be further compressed using methods such as the run-length encoding and Huffman coding.

When the primary compression method of the present example is used, since the reduced vertex data cannot be restored, the primary decompression unit 1112 and the primary decompression unit 2113 output the three-dimensional data having 1,369 vertex points as the primary decompressed data after the run-length encoding or Huffman coding has been decompressed in the example described above.

Further, when the primary compression method of the present example is used, the residual calculating unit 1113 calculates the primary residual data 111d as follows. First, for each vertex $P_k$ of the original three-dimensional data 111a, the corresponding reference point $Q_{ij}$ is derived using the primary compression method of the present example. The three-dimensional coordinate of a vertex $R_k$ of the primary residual data 111d is the difference between the three-dimensional coordinates of $Q_{ij}$ and $P_k$, and the texture luminance of $R_k$ is the difference between the texture luminance values of $Q_{ij}$ and $P_k$.

The primary compression method described above is merely an example, and other various three-dimensional data compression methods can be used.

<An Example of Secondary Compression Method and its Decompression Method>

Various data compression methods can be utilized as the compression method of the secondary compression unit 1114 that compresses the primary residual data 111d. For instance, a reversible compression method such as the run-length encoding and Huffman coding can be used.

Further, since the three-dimensional coordinates and texture luminance values of the residual data are residual difference data, a compression method taking advantage of the fact that the ranges of these values are small can be used. For instance, let's assume that the three-dimensional data are data in which (x, y, z) in a range of ±10 cm is measured by a three-dimensional shape measuring device, and the measurement accuracy of the three-dimensional shape measuring device is 0.1 mm. In this case, in order to accurately describe the three-dimensional data, as a data type, the value of (x, y, z) requires 2,000 steps. In other words, the number of quantization bits should be 11 or more. However, if each value of (x, y, z) of the primary residual data falls within a range of ±1 mm, the number of quantization steps required to restore the original data with an accuracy of 0.1 mm is 20 (5 in the number of quantization bits). In other words, the secondary compressed data can be less than a half of the three-dimensional data. Of course, a reversible compression method such as the run-length encoding and Huffman coding can further be used to compress the data.

Second Example

Figure 7:
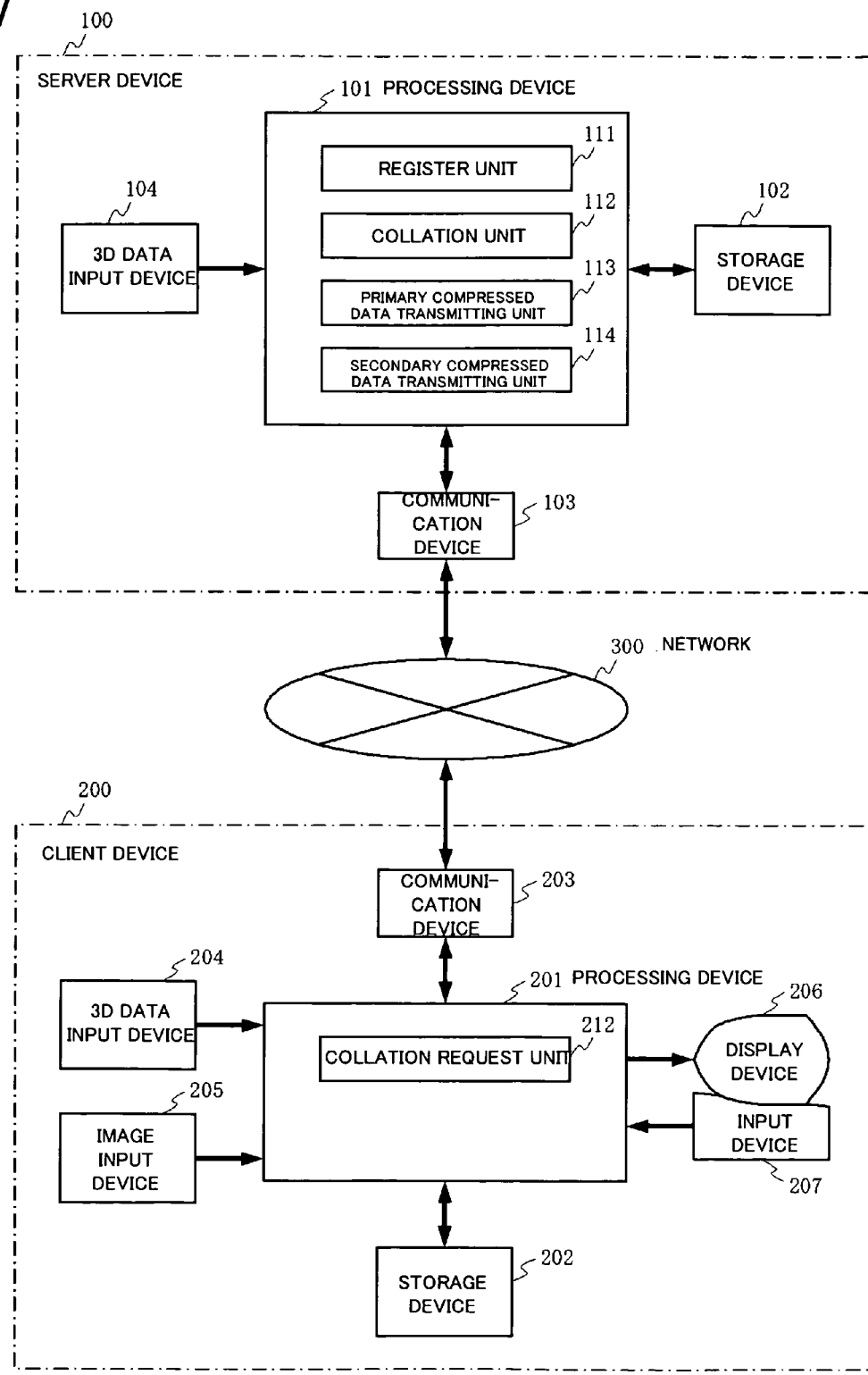
FIG. 7 is a block diagram of a three-dimensional data processing system relating to a second example of the present invention.

Referring to FIG. 7, in a three-dimensional data processing system relating to a second example of the present invention, compared with the first example in FIG. 1, a secondary compressed data transmitting unit 114 is added to the processing device 101 of the server device 100, and the processing device 201 of the client device 200 comprises a collation request unit 212, instead of the collation request unit 211.

Figure 8:
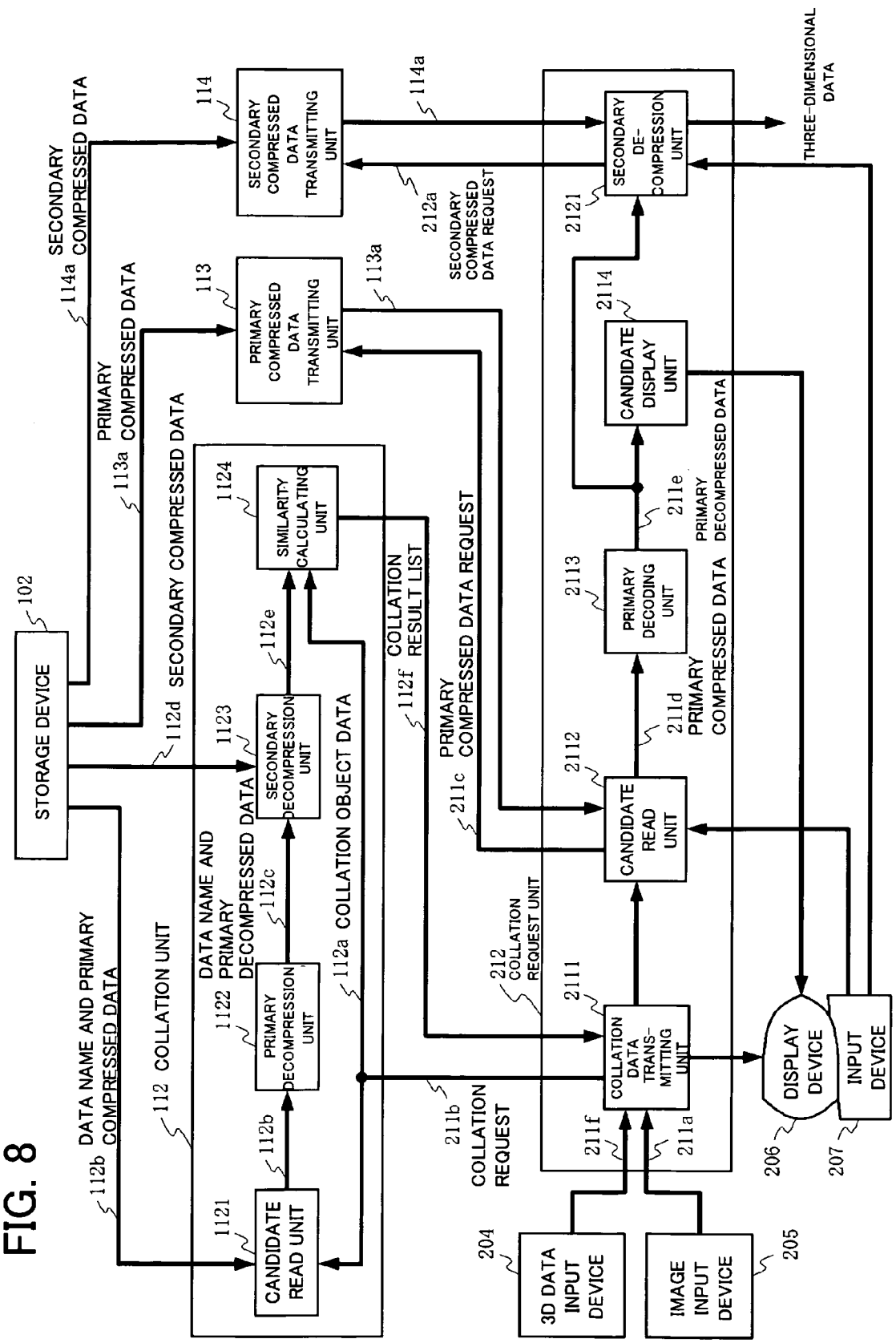
FIG. 8 is a block diagram showing a configuration example of a section related to collation in the three-dimensional data processing system relating to the second example of the present invention.

Referring to FIG. 8, the collation request unit 212 further comprises secondary decompression unit 2121, compared with the collation request unit 211 in FIG. 4. When the user selects a data name from the collation result list displayed on the display device 206 and requests high-definition data, this secondary decompression unit 2121 transmits a secondary compressed data request 212a that includes the selected data name to the secondary compressed data transmitting unit 114 of the server device 100 via the network 300, and restores the original three-dimensional data from the residual data decompressed from secondary compressed data returned as the response to the request and the corresponding primary decompressed data decompressed by the primary decompression unit 2113. The three-dimensional data decompressed by the secondary decompression unit 2121 are stored in, for instance, the storage device 202.

Further, when the secondary compressed data transmitting unit 114 receives the secondary compressed data request 212a, it reads out the secondary compressed data 114a of the reference object with the data name included in the request from the storage device 102, and transmits the data to the origin of the request via the network 300.

Next, the operation of the present example will be described.

The operations in which the client device 200 transmits the collation object data, which are the three-dimensional data or image data of the collation object, to the server device 100, the server device 100 collates the collation object data with the three-dimensional data of each reference object stored in the storage device 102, and the three-dimensional data of several reference objects of higher similarities are displayed on the display device 206 of the client device 200 are the same as those in the first example. In the present example, when the client device 200 requires the original high-definition three-dimensional data of the candidate data displayed, the user specifies a data name and requests them from the secondary decompression unit 2121.

The secondary decompression unit 2121 transmits the secondary compressed data request 212a that includes the specified data name to the secondary compressed data transmitting unit 114 of the server device 100 via the network 300. The secondary compressed data transmitting unit 114 receives the secondary compressed data request 212a, reads out the secondary compressed data 114a of the reference object with the data name included in the request from the storage device 102, and transmits them to the secondary decompression unit 2121. The secondary decompression unit 2121 restores the original three-dimensional data from the residual data decompressed from the secondary compressed data received and the corresponding primary decompressed data decompressed by the primary decompression unit 2113, and stores them in, for instance, the storage device 202.

According to the present example, the same effects as those in the first example can be obtained, and since only the secondary compressed data of the candidates selected from the candidates included in the collation results are obtained from the server device and the original high definition three-dimensional data are restored, the transmitted data amount can be reduced, compared with the case where the secondary compressed data of all the candidates are transmitted.

Example 3

Figure 9:
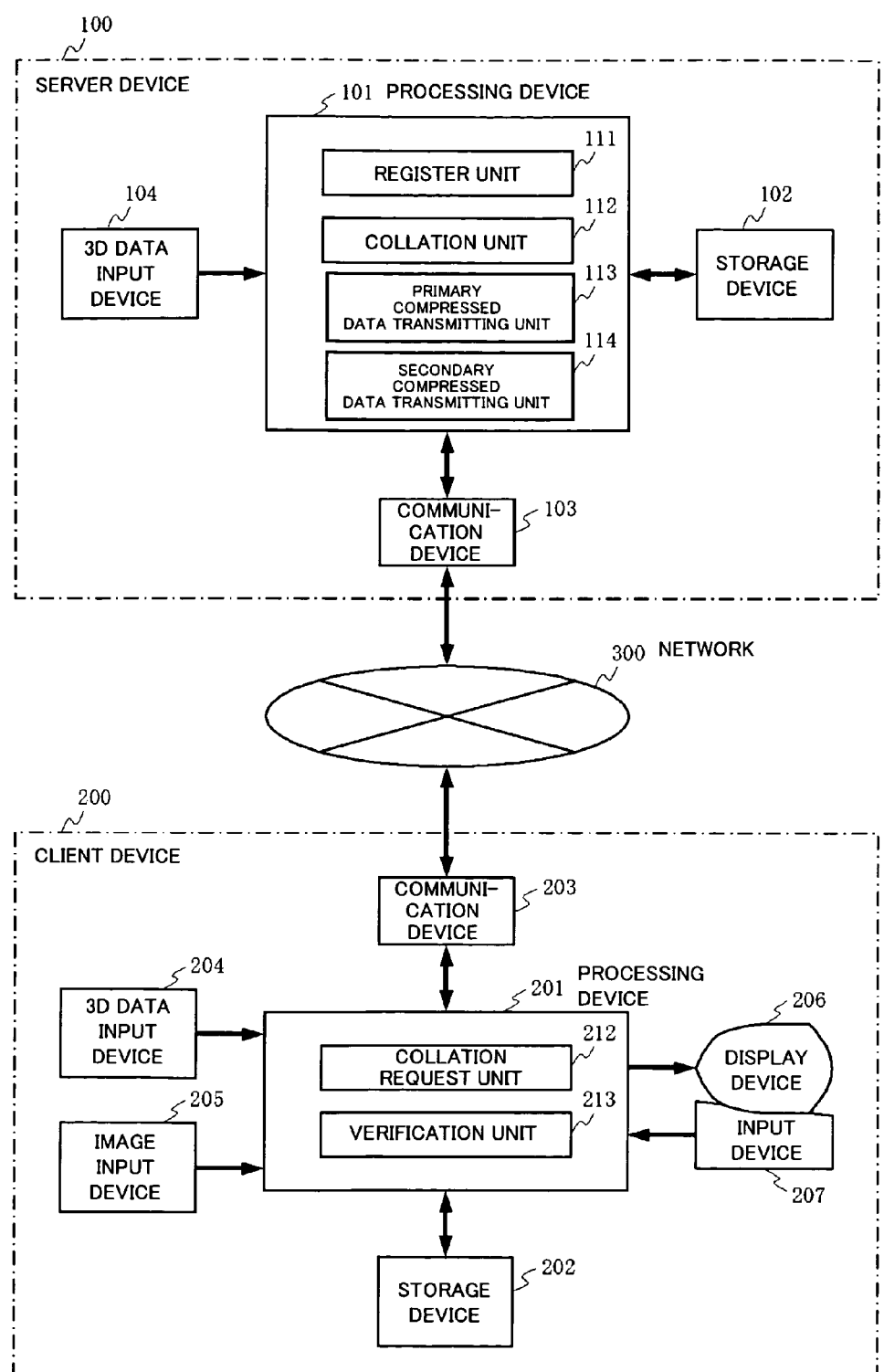
FIG. 9 is a block diagram of a three-dimensional data processing system relating to a third example of the present invention.

Referring to FIG. 9, in a three-dimensional data processing system relating to a third example of the present invention, a verification unit 213 is further added to the processing device 201 of the client device 200, compared with the second example in FIG. 7.

Figure 10:
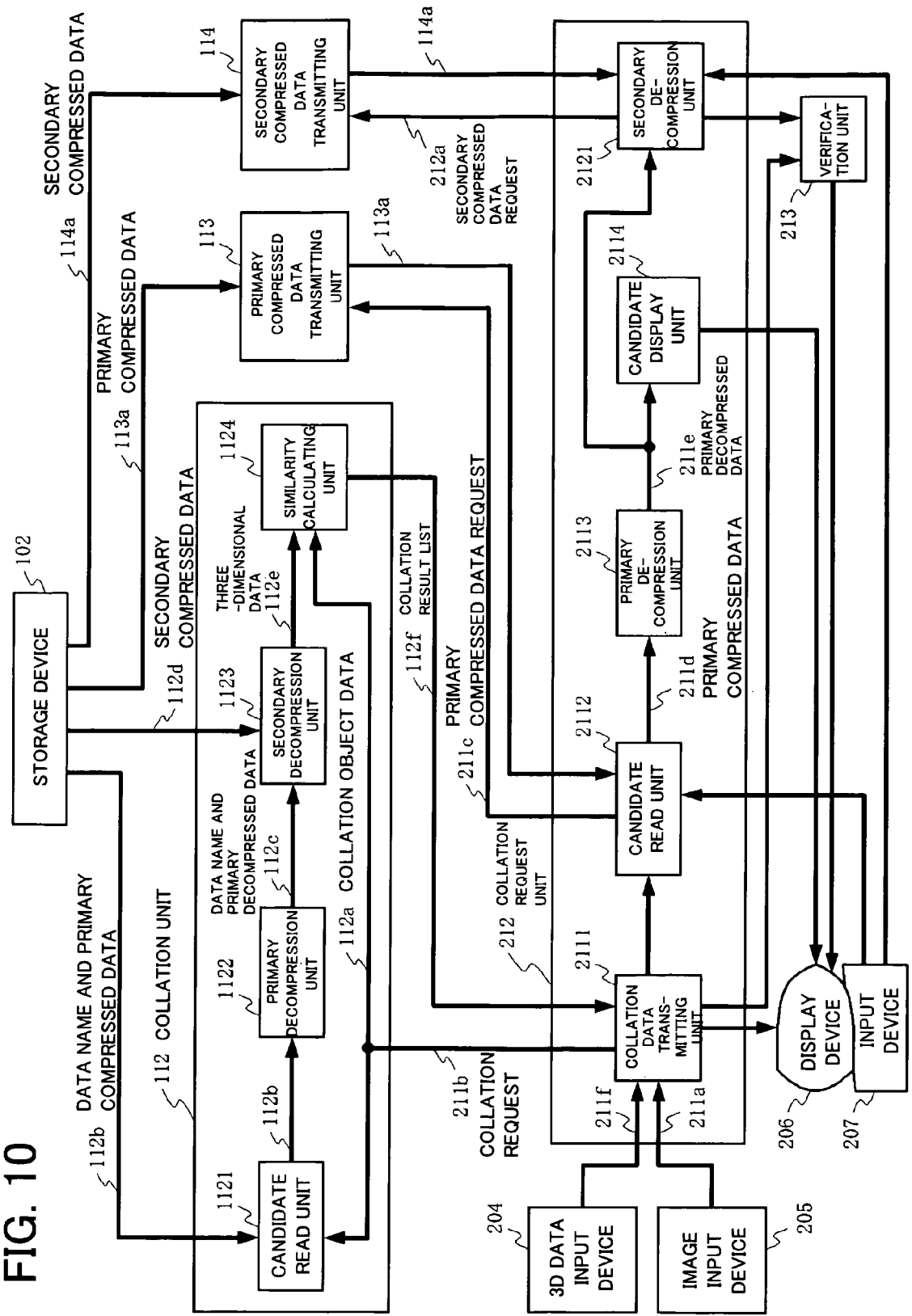
FIG. 10 is a block diagram showing a configuration example of a section related to collation in the three-dimensional data processing system relating to the third example of the present invention.

Referring to FIG. 10, the verification unit 213 receives decompressed three-dimensional data from the secondary decompression unit 2121 of the collation request unit 212 and the collation object data from the collation data transmitting unit 2111, and verifies if these data match. Various methods can be utilized for this verification processing, but for instance, a method called superimpose method described below can be used. Note that image data are used as the collation object data and the object collation method described in Patent Document 1 is used by the collation unit 112 as the collation method.

First, the verification unit 213 displays the image of the collation object data on the screen of the display device 206. Next, using the three-dimensional data decompressed by the secondary decompression unit 2121, an image showing a posture similar to that in the aforementioned image is generated as a comparison image and superimposed on the screen of the display device 206. In order to generate this image, data such the posture of the object and the illumination conditions are required. When the technology of Patent Document 1 is used, these data are estimated during the collation processing. Therefore, by having these data included in the collation result list, the verification unit 213 can obtain the data required to generate the comparison image. This is merely an example and various methods (having the user correct the posture when necessary or specifying characteristic parts of the object and calculating the posture parameters so that these parts match) can be utilized. Using the technique described above, whether or not the collation results are correct can be determined by having the user visually compare the generated comparison image and the image of the input data. When the result is not correct, the user can perform verification again by returning to the processing of the secondary decompression unit 2121 and specifying another candidate. Further, it is also possible to return to the processing of the collation data transmitting unit 2111 and correct and change the input data so that the correct collation results are obtained.

According to the present example, the same effects as those in the second example can be obtained, and since the user can verify the collation results utilizing the accurate three-dimensional data, accurate collation results can be obtained.

The examples of the present invention have been described above, however, it should be noted that the present invention is not limited to the examples above and that it is possible to have various modifications and additions. Further, the functions of the present invention can be realized not only with hardware, but also with a computer and program. The program is stored and provided in a computer readable recording medium such as a magnetic disk and semiconductor memory and is read by the computer at startup. The program has the computer function as the server device or the client device described in each example above by controlling the operation of the computer.

According to the present invention, in a system that stores a large amount of three-dimensional data and recognizes an object using images and three-dimensional data, the display of results and the acquisition of accurate collation results can be performed at high speed without sacrificing the recognition performance.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A three-dimensional data processing system comprising:
    a storage device that stores three-dimensional data of each reference object in a set of primary compressed data prepared by compressing the three-dimensional data in an irreversible compression method and secondary compressed data for compensating for the difference resulting from said irreversible compression method;
    a collating unit that collates three-dimensional data decompressed from the primary compressed data and the secondary compressed data of each reference object with collation object data, which are three-dimensional data or image data of a collation object; and a candidate display unit that decompresses the primary compressed data of several reference objects of higher similarities included in collation results and displaying the decompressed data on a display device, wherein a compression method in which a coupling coefficients for synthesizing certain three-dimensional data by linear-combining a plurality of basic three-dimensional data become the compressed data of the certain three-dimensional data is used as said irreversible compression method.

2. A three-dimensional data processing system comprising:

a storage device that stores three-dimensional data of each reference object in a set of primary compressed data prepared by compressing the three-dimensional data in an irreversible compression method and secondary compressed data for compensating for the difference resulting from said irreversible compression method;

a collating unit that collates three-dimensional data decompressed from the primary compressed data and the secondary compressed data of each reference object with collation object data, which are three-dimensional data or image data of a collation object;

a candidate display unit that decompresses the primary compressed data of several reference objects of higher similarities included in collation results and displaying the decompressed data on a display device; and a server device and a client device connected to each other via a network, wherein said server device comprises said storage device and said collating unit, and said client device comprises a candidate display unit, wherein said client device comprises a secondary decompression unit that obtains secondary compressed data of a reference object, requested by a user, from said server device and generates high-definition three-dimensional data by adding the secondary compressed data to the three-dimensional data decompressed from the primary compressed data of the reference object.

3. The three-dimensional data processing system as defined in claim 2, wherein said client device comprises a verification unit that verifies whether or not said collation object data and the three-dimensional data generated by said secondary decompression unit match.

4. A three-dimensional data processing method including:

having a client device transmit collation object data, which are three-dimensional data or image data of a collation object, to a server device via a network;

having said server device collate said collation object data with three-dimensional data of each reference object decompressed from primary compressed data and secondary compressed data of each reference object read out from a storage device that stores three-dimensional data of each reference object in a set of the primary compressed data prepared by compressing the three-dimensional data in an irreversible compression method and the secondary compressed data for compensating for the difference resulting from said irreversible compression method, and transmit the primary compressed data of several reference objects of higher similarities to said client device via the network; and having said client device decode the received primary compressed data and display the decompressed data on a display device, wherein in said irreversible compression method, coupling coefficients for synthesizing three-dimensional data by linear-combining a plurality of basic three-dimensional data become the compressed data of the three-dimensional data.

5. A server device comprising:

a storage device that stores three-dimensional data of each reference object in a set of primary compressed data prepared by compressing the three-dimensional data in an irreversible compression method and secondary compressed data for compensating for a difference resulting from said irreversible compression method, wherein in said irreversible compression method, coupling coefficients for synthesizing three-dimensional data by linear-combining a plurality of basic three-dimensional data become the compressed data of the three-dimensional data; and a processing device that receives collation object data, which are three-dimensional data or image data of a collation object, from a client device via a network, collates three-dimensional data decompressed from the primary compressed data and the secondary compressed data of each reference object with the received collation object data, and transmits the primary compressed data of several reference objects of higher similarities to said client device via the network.

6. The server device as defined in claim 5, wherein said secondary compressed data are prepared by compressing said difference.

7. A client device comprising:

a collation request unit that transmits a collation request including collation object data, which are three-dimensional data or image data of a collation object, to a server device via a network; receiving primary compressed data prepared by compressing three-dimensional data of a reference object similar to said collation object data in an irreversible compression method from said server device; decompressing the primary compressed data; and displaying the decompressed data on a display device; and a secondary decompression unit that obtains secondary compressed data of said reference object, requested by a user, from said server device and generates high-definition three-dimensional data by adding the secondary compressed data to three-dimensional data decompressed from primary compressed data of said reference object.

8. The client device as defined in claim 7 further comprising a verification unit that verifies whether or not said collation object data and the three-dimensional data generated by said secondary decompression unit match.

9. A non-transitory computer-readable medium encoded with a computer program for execution on a computer, the program configured such that the computer comprises a storage device that stores three-dimensional data of each reference object in a set of primary compressed data prepared by compressing the three-dimensional data in an irreversible compression method and secondary compressed data for compensating for a difference resulting from said irreversible compression method, wherein in said irreversible compression method, coupling coefficients for synthesizing three-dimensional data by linear-combining a plurality of basic three-dimensional data become the compressed data of the three-dimensional data, function as a unit that receives collation object data, which are three-dimensional data or image data of a collation object, from a client device via a network;

a unit that collates three-dimensional data decompressed from the primary compressed data and the secondary compressed data of each reference object with said collation object data received; and a unit that transmits primary compressed data of several reference objects of higher similarities to said client device via the network.

10. The non-transitory computer-readable medium as defined in claim 9, wherein said secondary compressed data are prepared by compressing said difference.

11. A non-transitory computer-readable medium encoded with a computer program configured to have a computer function as a unit that transmits a collation request that includes collation object data, which are three-dimensional data or image data of a collation object, to a server device via a network; and a unit that receives primary compressed data prepared by compressing three-dimensional data of a reference object similar to said collation object data in an irreversible compression method from said server device, decompresses the primary compressed data, and displays the decompressed data on a display device, the program having the computer further function as secondary decompression unit that obtains secondary compressed data of said reference object from said server device and generates high-definition three-dimensional data by adding the secondary compressed data to three-dimensional data decompressed from primary compressed data of said reference object.

12. The non-transitory computer-readable medium as defined in claim 11, having the computer further function as a verification unit that verifies whether or not said collation object data and the three-dimensional data generated by said secondary decompression unit match.

\* \* \* \* \*